(12) United States Patent
Chen et al.

(10) Patent No.: US 11,292,747 B2
(45) Date of Patent: Apr. 5, 2022

(54) BARIUM STRONTIUM TITANATE-BASED DIELECTRIC CERAMIC MATERIALS, PREPARATION METHOD AND APPLICATION THEREOF

(71) Applicant: SHANGHAI INSTITUTE OF CERAMICS, CHINESE ACADEMY OF SCIENCES, Shanghai (CN)

(72) Inventors: Ying Chen, Shanghai (CN); Xianlin Dong, Shanghai (CN); Xin Li, Shanghai (CN); Feng Jiang, Shanghai (CN); Yongjian Wang, Shanghai (CN)

(73) Assignee: SHANGHAI INSTITUTE OF CERAMICS, CHINESE ACADEMY OF SCIENCES, Shanghai (CN)

( * ) Notice: Subject to any disclaimer, the term of this patent is extended or adjusted under 35 U.S.C. 154(b) by 92 days.

(21) Appl. No.: 16/831,631

(22) Filed: Mar. 26, 2020

(65) Prior Publication Data
US 2020/0308059 A1 Oct. 1, 2020

(30) Foreign Application Priority Data

Apr. 1, 2019 (CN) .......................... 201910258238.7

(51) Int. Cl.
*C04B 35/468* (2006.01)
*C04B 35/47* (2006.01)
*C04B 35/64* (2006.01)
*C04B 35/634* (2006.01)
*C04B 35/626* (2006.01)

(52) U.S. Cl.
CPC .... *C04B 35/4682* (2013.01); *C04B 35/62675* (2013.01); *C04B 35/62695* (2013.01); *C04B 35/63416* (2013.01); *C04B 35/64* (2013.01); *C04B 2235/3206* (2013.01); *C04B 2235/3217* (2013.01); *C04B 2235/3236* (2013.01); *C04B 2235/3298* (2013.01); *C04B 2235/3418* (2013.01); *C04B 2235/442* (2013.01); *C04B 2235/5436* (2013.01); *C04B 2235/5445* (2013.01); *C04B 2235/604* (2013.01); *C04B 2235/6567* (2013.01); *C04B 2235/661* (2013.01)

(58) Field of Classification Search
CPC .................................................. C04B 35/4682
See application file for complete search history.

(56) References Cited

U.S. PATENT DOCUMENTS

| 4,058,404 A | * | 11/1977 | Fujiwara | ............... C04B 35/465 501/137 |
| 4,335,216 A | * | 6/1982 | Hodgkins | ............ H01G 4/1245 501/138 |
| 2010/0120606 A1 | * | 5/2010 | Nenasheva | ............. C04B 35/47 501/138 |

FOREIGN PATENT DOCUMENTS

| JP | 2007153659 A | * | 6/2007 |
| JP | 2008174413 A | * | 7/2008 |

* cited by examiner

*Primary Examiner* — Karl E Group
(74) *Attorney, Agent, or Firm* — Alleman Hall Creasman & Tuttle LLP

(57) ABSTRACT

The present application relates to a barium strontium titanate-based dielectric ceramic material, a preparation method, and application thereof. The composition of the barium strontium titanate-based dielectric ceramic material comprises: $aBaTiO_3+bSrTiO_3+cTiO_2+dBi_2O_3+eMgO+fAl_2O_3+gCaO+hSiO_2$, wherein a, b, c, d, e, f, g, and h are the molar percentage of each component, $20 \le a \le 50$ mol %, $15 \le b \le 30$ mol %, $10 \le c \le 20$ mol %, $0 \le d \le 10$ mol %, $0 \le e \le 35$ mol %, $0 \le f \le 6$ mol %, $0 \le g \le 6$ mol %, $0 \le h \le 1$ mol %, and $a+b+c+d+e+f+g+h=100$ mol %.

3 Claims, 9 Drawing Sheets

BARIUM STRONTIUM TITANATE-BASED DIELECTRIC CERAMIC MATERIALS, PREPARATION METHOD AND APPLICATION THEREOF

TECHNICAL FIELD

The present application relates to a barium strontium titanate-based dielectric ceramic material with a high dielectric constant, high dielectric strength and high dielectric stability, and a preparation method and application thereof, belonging to the technical field of electronic ceramic materials.

BACKGROUND

Capacitors are the main components in electronic equipment, which have the ability of isolation, coupling, bypass, filtering, tuning a circuit, energy conversion, controlling a circuit, and so on. In a wide variety of capacitors, ceramic dielectric capacitors can store energy directly in the form of static charge in the bipolar plate because of the polarization response under an external electric field. This process does not involve the diffusion of materials, and therefore they have a very high charging and discharging speed, and thus a very high output power density. At the same time, their high dielectric constant, high temperature resistance, and high corrosion resistance make them good prospects for broad application in the fields of flash photography, high power microwaves, high power radio frequency technology, materials research, etc., and have important social benefits and considerable economic benefits. With the development of science and technology and the change of application environment, ceramic capacitors tend to develop with high voltage gradients, miniaturization, environmental friendliness, high reliability, and low cost. Therefore, it is necessary to develop dielectric ceramic materials and capacitors with high dielectric strength, a high dielectric constant, low dielectric loss, and a low capacitance change rate. At present, many countries in the world are actively researching and developing dielectric ceramic materials and their capacitors with high dielectric strength, high dielectric constant, low dielectric loss, and stable dielectric properties under an external field.

The performance of a ceramic dielectric capacitor mainly depends on its ceramic medium. According to the polarization response mechanism under an electric field, the ceramic medium is divided into four kinds: linear dielectrics, ferroelectrics, relaxor ferroelectrics, and antiferroelectrics. Linear dielectrics have a basically stable dielectric constant under an external field, a high dielectric strength, and a low dielectric loss, but the dielectric constant is small, which is disadvantageous to energy storage. Ferroelectrics usually have a high dielectric constant, but the dielectric strength is not high, the dielectric constant drops sharply under an electric field, and the temperature stability is poor, and thus the lifetime and stability of a device made therefrom need to be improved. Antiferrodielectrics have a relatively high dielectric constant and a small remnant polarization, but the dielectric constant is also unstable in an external field (electric field or temperature field). In addition, because the antiferroelectric-ferroelectric phase transition is accompanied by a large strain, they are prone to breakdown under the turning electric field, and it is difficult to improve the dielectric strength.

The energy storage density, energy storage efficiency, dielectric constant, and dielectric strength of ceramic capacitors have the relationships as shown in the following formula:

$$W = \int_0^{P_{max}} E dP = \int_0^{P_{max}} \varepsilon_0 \varepsilon_r E dE \quad (1);$$

$$W_{rec} = \int_{P_r}^{P_{max}} E dP \quad (2);$$

$$\eta = W_{rec}/W \quad (3);$$

wherein W is the maximum energy storage density, $W_{rec}$ is the recoverable energy storage density, and $\eta$ is the energy storage efficiency. The higher the dielectric constant, the higher the dielectric strength, and the higher the energy storage density. Under an electric field, the more stable the electric polarization performance, the smaller the remnant polarization and the higher the energy storage efficiency. In terms of the intrinsic properties of the dielectric materials, the higher the dielectric constant, the worse the stability of the dielectric properties and the lower the dielectric strength, because the high dielectric constant is a result of a hybrid of the d-orbit. How to prepare a dielectric ceramic with high dielectric strength, high dielectric constant, and high dielectric stability is the bottleneck problem to be solved for high power capacitors. Barium strontium titanate (($Ba_xSr_{1-x}$)$TiO_3$, BST for short) is a solid solution of barium titanate ($BaTiO_3$) and strontium titanate ($SrTiO_3$). It has a high dielectric constant and a low dielectric loss. Changing the ratio of Ba/Sr can adjust the dielectric properties of the material in a wide temperature range. Compared with other material systems, it is more suitable for manufacturing high-power energy storage capacitors. People have carried out extensive research on (Ba, Sr) $TiO_3$ based materials. The increase in the Ba/Sr ratio is beneficial to the increase in the dielectric constant, i.e. the increase in the remnant polarization, but it will lead to the decrease in dielectric strength and energy storage density. The addition of Mg, Al, Zr, Si oxides and the like is beneficial to the increase in the dielectric strength, but the dielectric constant decreases, and the energy storage density will also decrease. H. B. Yang et al. (J. EUR. Ceram. SOC. 381367-1373 (2018)) added $Bi_2O_3$—$B_2O_3$—$SiO_2$ glass into $Ba_{0.4}Sr_{0.6}TiO_3$ to obtain a material with an energy storage density up to 1.98 J/cm³ at 279 kV/cm.

SUMMARY

In view of the above problems, the present application aims to provide a ceramic system with a high dielectric strength, a high dielectric constant, and high dielectric stability, and a preparation method thereof.

In one aspect, the present application provides a barium strontium titanate based dielectric ceramic material with high dielectric constant, high dielectric strength and high dielectric stability, having a composition of aBaTiO3+bSrTiO3+cTiO2+d $Bi_2O_3$+eMgO+fAl2O3+gCaO+hSiO2, wherein a, b, c, d, e, f, g, and h are the molar percentage of each component, 20≤a≤50 mol %, 15≤b≤30 mol %, 10≤c≤20 mol %, 0≤d≤10 mol %, 0≤e≤35 mol %, 0≤f≤6 mol %, 0≤g≤6 mol %, 0≤h≤1 mol %, and a+b+c+d+e+f+g+h=100 mol %.

In the present application, a new material system is developed on the basis of a (Ba,Sr)$TiO_3$ based dielectric material, and the micro-structure of the ceramic material is controlled through multi-ion co-doping, so as to improve the anti-reducibility of the matrix, reduce the ion defects, and widen the ferroelectric-paraelectric phase transition temperature range of the ceramic material. Accordingly, the high dielectric constant of the ceramic material can be maintained, while the dielectric strength and the dielectric stability can be greatly improved, breaking through the current technical hindrance.

Preferably, the barium strontium titanate dielectric ceramic material has a dielectric strength of 38 to 52 kV/mm at a thickness of 0.38 mm, a dielectric constant adjustable from 800 to 2,000, a dielectric loss of 0.003 or less (at 1 kHz), an effective energy storage density of 8.6 J/cm$^3$ at 660 kV/cm, a variation of permittivity with temperature of 7% or less (at 0° C. to 40° C.), a good frequency stability, and a DC resistivity of $10^{12}$ Ω·cm or more (at 100° C.).

In another aspect, the present application provides a preparation method of the barium strontium titanate-based dielectric ceramic material with the high dielectric constant, the high dielectric strength and high dielectric stability, as mentioned above, comprising the steps of:

weighing and mixing a Ti source, a Ba source, a Sr source, a Bi source, a Mg source, a Ca source, an Al source, and a Si source according to a chemical composition of the barium strontium titanate-based dielectric ceramic material, and pre-sintering the mixture to obtain a mixed powder;

preparing a green body from the mixed powder; and sintering the green body to obtain the barium strontium titanate-based dielectric ceramic material having a composition of $aBaTiO_3+bSrTiO_3+cTiO_2+d\ Bi_2O_3+eMgO+fAl_2O_3+gCaO+hSiO_2$.

Preferably, the Ti source may be at least one of $TiO_2$, $C_{16}H_{36}O_4Ti$, $C_{12}H_{28}O_4Ti$, $SrTiO_3$, $BaTiO_3$, and $TiCl_4$.

Preferably, the Ba source may be at least one of $BaO$, $BaCO_3$, $C_4H_6BaO_4$, $Ba(NO_3)_2$, and $BaTiO_3$.

Preferably, the Sr source may be at least one of $SrO$, $SrCO_3$, $C_4H_6SrO_4$, $Sr(NO_3)_2$, and $SrTiO_3$.

Preferably, the Bi source may be at least one of $Bi_2O_3$, $BiCl_3$, $Bi(OH)_3$, and $Bi_5(OH)_9(NO_3)_4$.

Preferably, the Mg source may be at least one of $MgO$, $MgCO_3$, $C_4H_6MgO_4$, and $MgTiO_3$.

Preferably, the Ca source may be at least one of $CaO$, $CaCO_3$, $C_4CaH_6O_4 \cdot H_2O$, and $CaTiO_3$;

Preferably, the Al source may be at least one of $Al_2O_3$, $Al(NO_3)_3$, and $Al(OH)C_4H_6O_4$.

Preferably, the Si source may be at least one of $SiO_2$, $(C_2H_5O)_4Si$, and $C_{16}H_{36}O_4Si$.

Preferably, pre-sintering the mixture is performed at 1,000° C. to 1,150° C. for 2 to 12 hours.

Preferably, the particle size of the mixed powder is 0.2 to 2.5 μm.

Preferably, preparing the green body from the mixed powders may comprise the steps of:

adding a binder to the mixed powder; and subjecting the resulting mixture to spray granulation and forming to obtain the green body.

Preferably, the binder may be at least one of polyvinyl alcohol, polyvinyl butyral, and methyl cellulose, and preferably the binder may be added in an amount of 0.2 to 3 wt %, preferably 0.5 to 1 wt %, with respect to a total mass of the mixed powder.

Preferably, the forming may be performed by isostatic pressing, and the pressure of the isostatic pressing may be 180 to 300 MPa.

Preferably, the sintering temperature may be 1,220 to 1,300° C.

Preferably, the sintering time may be 2 to 24 hours. The sintering time is prolonged with the increase of the mole number of the prepared powder.

Compared with the prior art, the strontium barium titanate-based dielectric ceramic material prepared by a traditional solid-state method in the present application has an extremely high dielectric strength and energy storage density (for example, a sample with a dielectric constant of 1,080 has a dielectric strength of 40 kV/mm at 1 mm thick, 52 kV/mm at 0.38 mm thick, and 66 kV/mm at 0.14 mm thick; and effective energy storage: W: 8.6 J/cm$^3$, η: 71% at 660 kV/cm, W: 2.1 J/cm$^3$, η: 80% at 223 kV/cm), the dielectric constant is adjustable from 800 to 2,000, the dielectric loss is ≤0.003 at 1 kHz, and the dielectric property is stable under an external field. The change rate of the dielectric constant with temperature is ≤7% (0° C. to 40° C.), the frequency stability is good, and the DC resistivity is as high as $10^{12}$ Ω·cm or more (at 100° C.). The material has the advantages of a high dielectric constant, high voltage resistance, good dielectric stability, being lead free and environmentally friendly, a simple preparation process, etc., and thus has a significant application value and is very suitable for making high-frequency, high-voltage capacitors, pulse forming lines, etc.

DETAILED DESCRIPTION

Figure 1:
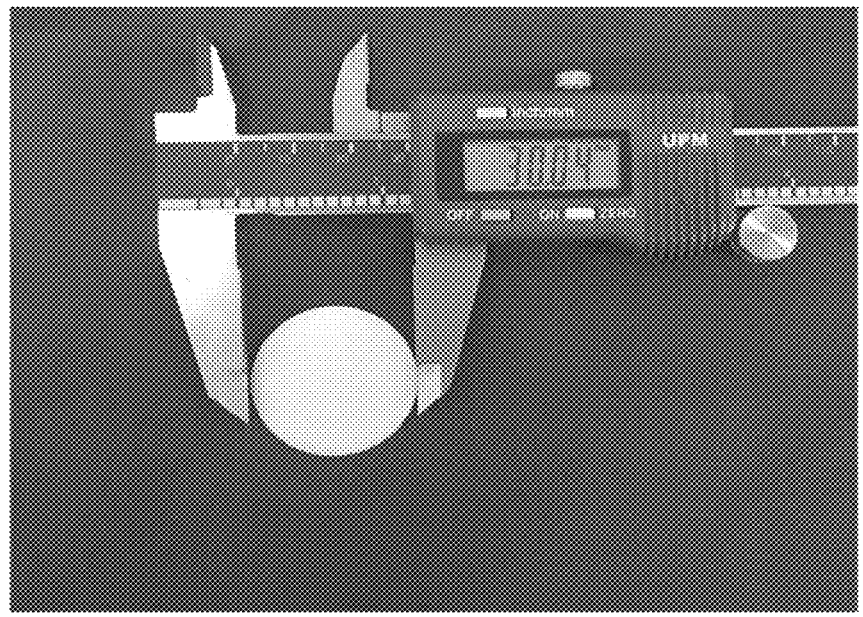
FIG. 1 is a photograph of the standard ceramic sheet prepared in Examples 1-4 of the present application for measurement of dielectric constant/dielectric loss.
Figure 2:
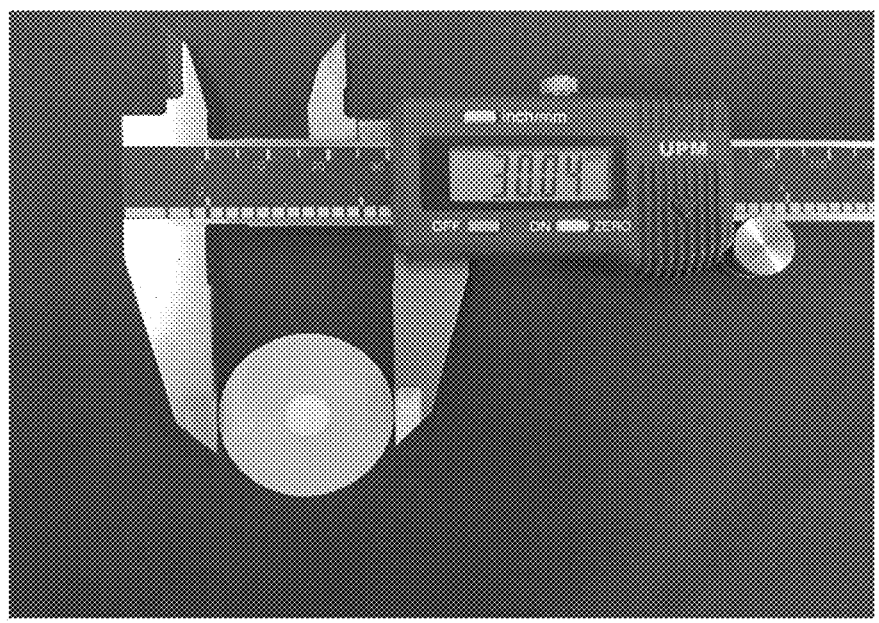
FIG. 2 is a photograph of the standard ceramic sheet prepared in Examples 1-4 of the present application for measurement of dielectric strength.

Selected embodiments of the present disclosure will now be described. It will be apparent to those skilled in the art from this disclosure that the following descriptions of the embodiments of the disclosure are provided for illustration only and not for the purpose of limiting the disclosure as defined by the appended claims and their equivalents.

In the present disclosure, a composition of a barium strontium titanate based dielectric ceramic material system with high dielectric strength, a high dielectric constant and high dielectric stability comprises: $aBaTiO_3+bSrTiO_3+cTiO_2+d Bi_2O_3+eMgO+fAl_2O_3+gCaO+hSiO_2$, wherein a, b, c, d, e, f, g, and h are the mole percentage of each component, $20 \leq a \leq 50$ mol %, $15 \leq b \leq 30$ mol %, $10 \leq c \leq 20$ mol %, $0 \leq d \leq 10$ mol %, $0 \leq e \leq 35$ mol %, $0 \leq f \leq 6$ mol %, $0 \leq g \leq 6$ mol %, $0 \leq h \leq 1$ mol %, and $a+b+c+d+e+f+g+h=100$ mol %. In the composition, if the content of $TiO_2$ is too high, the dielectric constant of the material will be greatly reduced, the dielectric loss will be increased, and both the energy storage density and energy storage efficiency will be reduced; if the content of $TiO_2$ is too low, the dielectric stability of the material will be greatly reduced under an external field, and the energy storage efficiency will be reduced.

In an optional embodiment, $20 \leq a \leq 50$ mol %, $15 \leq b \leq 30$ mol %, $10 \leq c \leq 20$ mol %, $3 \leq d \leq 10$ mol %, $4 \leq e \leq 35$ mol %, $0 \leq f \leq 6$ mol %, $3 \leq g \leq 6$ mol %, $0.1 \leq h \leq 1$ mol %, and $a+b+c+d+e+f+g+h=100$ mol %.

In the disclosure, the barium strontium titanate based dielectric ceramic material has the advantages of being lead free and environmentally friendly, a simple preparation process, being able to be used for large size sample preparation, etc. It is very suitable for the manufacture of various high-pressure energy storage and transmission media, and has great application value in the field of high power and pulse power. A preparation method of the barium strontium titanate based dielectric ceramic material is exemplarily illustrated as follows.

According to the chemical composition ($aBaTiO_3+bSrTiO_3+cTiO_2+dBi_2O_3+eMgO+fAl_2O_3+gCaO+hSiO_2$), a Ti source, a Ba source, a Sr source, a Bi source, a Mg source, a Ca source, an Al source and a Si source are weighed, mixed, and pre-sintered to obtain a mixed powder. Wherein, the Ti source is selected from $TiO_2$, $C_{16}H_{36}O_4Ti$, $C_{12}H_{28}O_4Ti$, $SrTiO_3$, $BaTiO_3$ and $TiCl_4$ etc. The Ba source is selected from BaO, $BaCO_3$, $C_4H_6BaO_4$, $Ba(NO_3)_2$ and $BaTiO_3$, etc. The Sr source is selected from SrO, $SrCO_3$, $C_4H_6SrO_4$, $Sr(NO_3)_2$ and $SrTiO_3$, etc. The Bi source is selected from $Bi_2O_3$, $BiCl_3$, $Bi(OH)_3$, $Bi_5(OH)_9(NO_3)_4$, etc. The MgO source is selected from MgO, $MgCO_3$, $C_4H_6MgO_4$, $MgTiO_3$, etc. The CaO source is selected from CaO, $CaCO_3$, $C_4CaH_6O_4 \cdot H_2O$, $CaTiO_3$, etc. The Al source is selected from $Al_2O_3$, $Al(NO_3)_3$, $Al(OH)C_4H_6O_4$, etc. The Si source is selected from $SiO_2$, $(C_2H_5O)_4Si$, $C_{16}H_{36}O_4Si$, etc. The mixed powder can be further subjected to grinding or ball milling, so that the particle size of the mixed powder is between 0.2 μm and 2.5 μm, which can facilitate subsequent pressing.

In an optional embodiment, the pre-sintering time is lengthened with the increase of the mole number of the prepared powder. The temperature of pre-sintering can be 1,000° C. to 1,150° C. The pre-sintering time can be 2 to 12 hours.

The mixed powder is mixed with a binder, then subjected to spray granulated and press molding to form a green body. The binder can be selected from polyvinyl alcohol, polyvinyl butyral, methylcellulose, etc. The amount of binder can be 0.2 to 3 wt %, preferably 0.5 to 1 wt % of the total mass of the mixed powder. The press molding method can be isostatic pressing, dry pressing, etc. The pressure of isostatic pressing can be 180 to 300 MPa.

The green body is sintered at 1220 to 1300° C. to obtain barium strontium titanate based dielectric ceramic material. The temperature and holding time of sintering can be determined according to the molar number of the prepared powder. The holding time of sintering can be 2 to 24 hours. When one or more of MgO, $Al_2O_3$ or CaO increases in large quantities, the temperature and/or holding time of sintering increases; when one or more of $Bi_2O_3$ or $SiO_2$ increases in large quantities, the temperature and/or holding time of sintering decreases.

Standard ceramic sheets are prepared from strontium barium titanate based dielectric ceramic material, and then painted with a silver electrode and fired for measurement of the dielectric properties and electrical strength.

In addition, the barium strontium titanate based dielectric ceramic material with the high dielectric constant, high dielectric strength and high dielectric stability obtained in the present application can achieve a size of greater than or equal to 300 mm in at least one dimension.

Hereinafter, the present invention will be better described with the following representative examples. It is understood that the following examples are only used to explain this invention and do not limit the scope of this invention, and any non-essential improvements and modifications made by a person skilled in the art based on this invention all fall into the protection scope of this invention. The specific parameters below are only exemplary, and a person skilled in the art can choose proper values within an appropriate range according to the description of this article, and are not restricted to the specific values cited below.

Example 1

Figure 3:
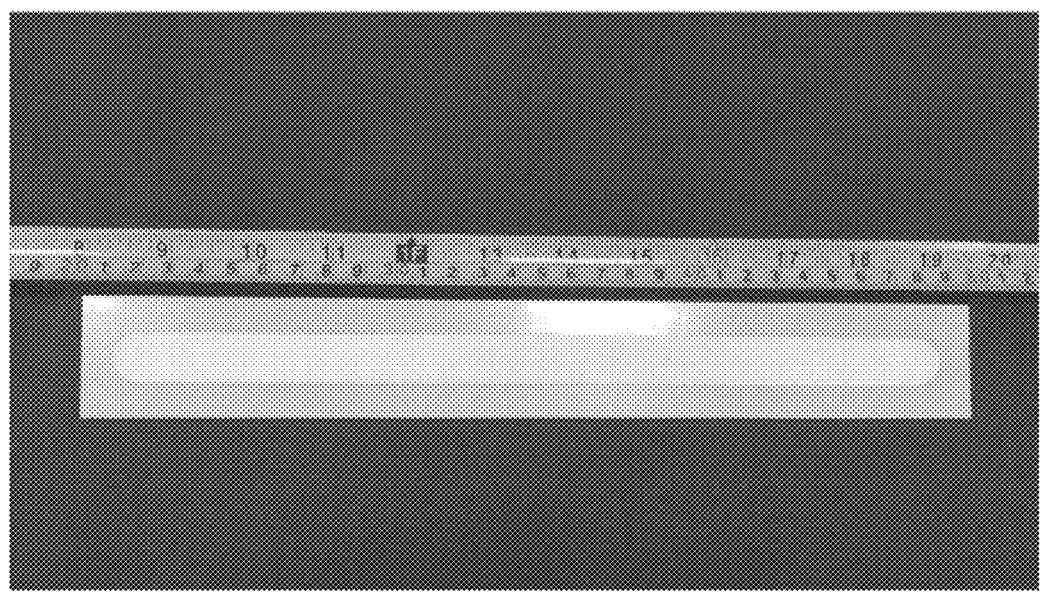
FIG. 3 is a photograph of a long strip shape barium strontium titanate based dielectric ceramic material (length 300 mm×width 40 mm×thickness 5 mm) prepared in Example 1 of the present application.

$BaTiO_3$, $SrTiO_3$, $TiO_2$, $Bi_2O_3$, MgO, $Al_2O_3$, $CaCO_3$ and $SiO_2$ were weighed according to the formula of $0.27BaTiO_3+0.22SrTiO_3+0.13TiO_2+0.036Bi_2O_3+0.29MgO+0.012Al_2O_3+0.04CaO+0.002SiO_2$, mixed by wet ball milling using water as the medium and agate balls as the grinding balls for 24 hours, discharged, and dried to give powders. The powders were pre-sintered at 1,050° C. for 6 hours, and then subjected to wet ball milling followed by drying, to give mixed powders having a particle size of 0.5 to 1.0 μm. The mixed powders were mixed with polyvinyl alcohol (PVA) at a ratio of 0.008 g PVA to 1 g mixed powders, and subjected to spray granulation, followed by isostatic pressing at a pressure of 200 MPa, to give green bodies with various sizes. The green bodies were sintered at 1,270° C. for 10 hours, and then naturally cooled to room temperature to give ceramic blocks. The obtained ceramic blocks were subjected to cutting and fine grinding to give a cuboid ceramic sheet having a length of 300 mm, a width of 40 mm, and a thickness of 5 mm (as shown in FIG. 3, ceramic material after processing and silver electrode firing) and cylindrical ceramic sheets having a diameter of 30 mm and a thickness of 1 mm, 0.38 mm and 0.14 mm, respectively.

Figure 4:
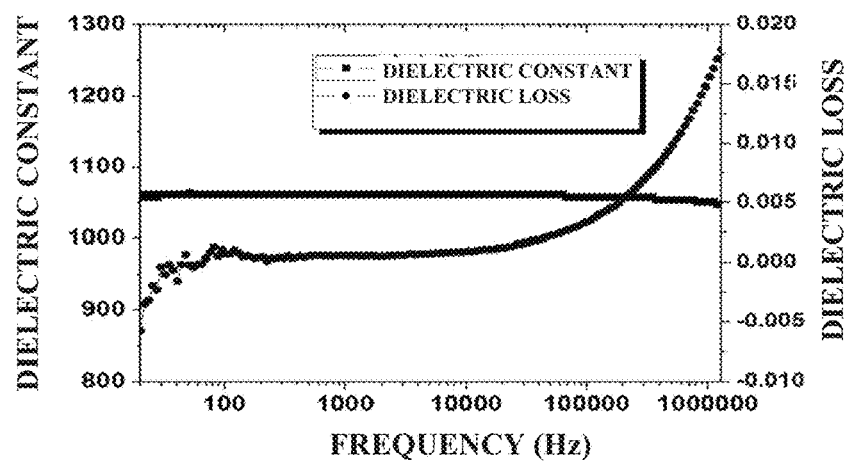
FIG. 4 shows the frequency dependence of the dielectric constant and loss of a standard ceramic sheet prepared in Example 1 of the present application.
Figure 5:
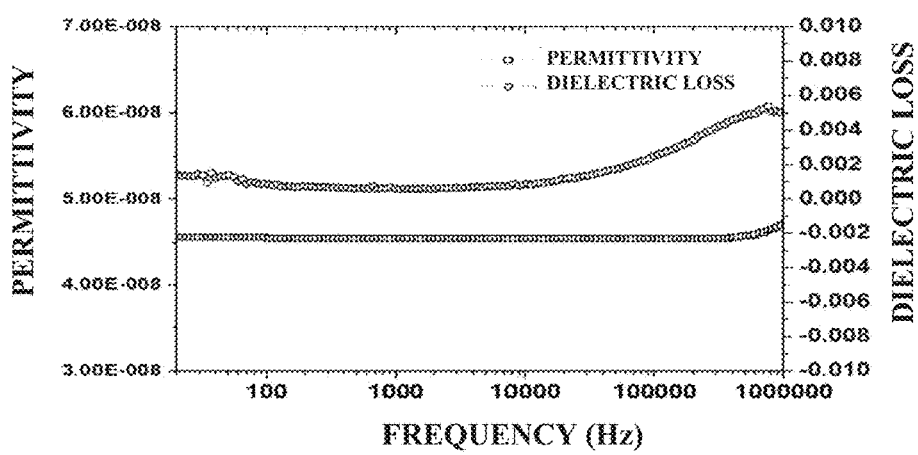
FIG. 5 shows the frequency dependence of the permittivity and loss of the big round cake ceramic material prepared in Example 1 of the present application.
Figure 6:
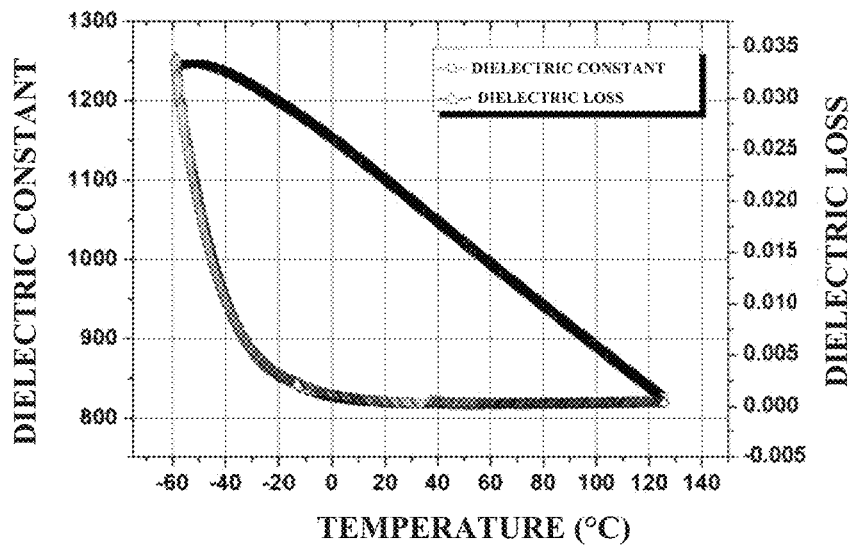
FIG. 6 shows the temperature dependence of the dielectric constant and loss of a standard ceramic sheet prepared in Example 1 of the present application.
Figure 7:
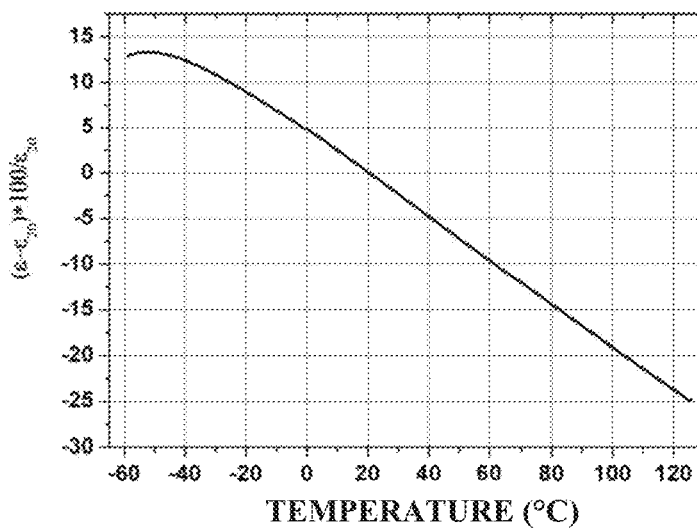
FIG. 7 shows a variation of dielectric constant with temperature of a standard ceramic sheet prepared in Example 1 of the present application.
Figure 8:
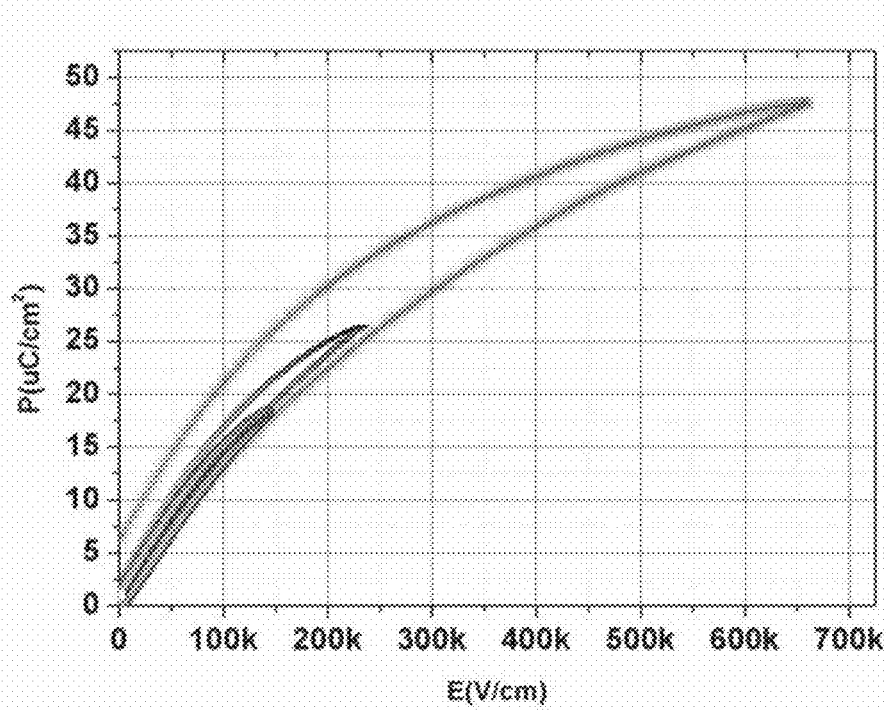
FIG. 8 shows polarization hysteresis loops under a strong electric field of a standard ceramic sheet prepared in Example 1 of the present application.
Figure 9:
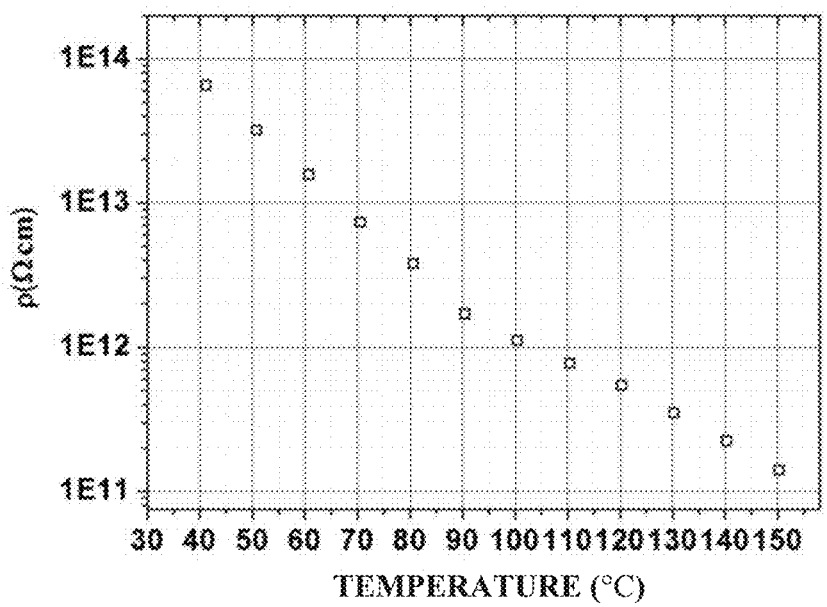
FIG. 9 shows the temperature dependence of DC resistivity of a standard ceramic sheet prepared in Example 1 of the present application.

The obtained ceramic sheets were coated with a silver electrode and fired for measurements of dielectric properties and dielectric strength. FIG. 4 shows the frequency dependence of dielectric constant and dielectric loss of the ceramic standard sheets (diameter 30 mm, thickness 1 mm) in this example. The dielectric constant of the ceramic sheet is about 1,080 in the frequency range of 100 Hz to 1 MHz, basically unchanged with the frequency, and the dielectric loss is about 0.0015 at 1 kHz. FIG. 5 shows the frequency dependence of the capacitance and dielectric loss of a large round cake ceramic material prepared in this example. It can be seen from FIG. 5 that although the ceramic size is greatly increased, the capacitance value is basically unchanged in the frequency range of 100 Hz to 1 MHz, and the dielectric loss is about 0.0015 at 1 kHz. FIG. 6 shows the temperature dependence of dielectric constant and dielectric loss of a ceramic standard sheet prepared in this example, and FIG. 7 shows a variation of dielectric constant with temperature of this sheet. As can be seen in FIG. 6 and FIG. 7, the dielectric constant gradually decreases as the temperature increases from −50° C., and the variation in permittivity are from +4.8 to −4.7 (at −0° C. to 40° C.) and +10.87 to −15.6 (at −30° C. to 85° C.). FIG. 8 shows the polarization hysteresis loops of a ceramic material prepared in this example under different electric fields. It can be seen from FIG. 8 that as the electric field increases until reaching a strong field, the polarization strength increases, and the electric polarization of the ceramic material tends to gradually become unstable, but the ceramic is highly efficient at energy storage, and the effective energy storage density and efficiency are: w: 8.6 J/cm$^3$ η: 71% at 660 kV/cm; w: 2.1 J/cm$^3$, η: 80% at 223 kV/cm. The dielectric strengths of the ceramic material at room temperature are 40.5 kV/mm, 51.6 kV/mm, 66 kV/mm (at 1 mm, 0.38 mm, 0.14 mm), respectively. FIG. 9 shows the curve of the DC resistivity of the ceramic material prepared by this example, as a function of temperature. It can be seen that, as the temperature increases from 40° C. to 150° C. the resistivity of the ceramic material decreases from 6.5×10$^{13}$ Ω·cm to 1.4×10$^{11}$ Ω·cm, but is still above 10$^{12}$ Ω·cm at 100° C., which shows that this material has good insulating properties. The relationship between the electric field and the electric polarization of the ceramic material was measured by a TF-2000 ferroelectric analyzer, and the energy storage density and energy storage efficiency of the ceramic material were calculated by Origin software.

Example 2

Figure 10:
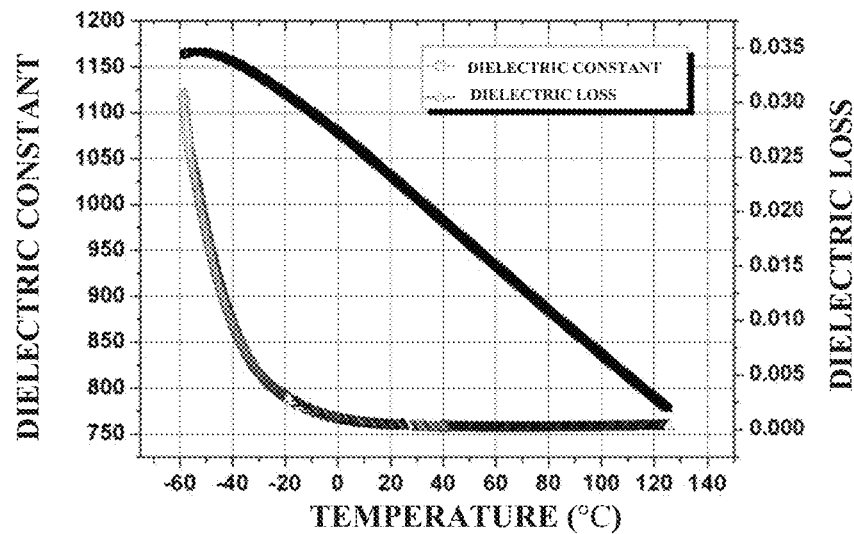
FIG. 10 shows the temperature dependence of the dielectric constant and loss of a standard ceramic sheet prepared in Example 2 of the present application.
Figure 11:
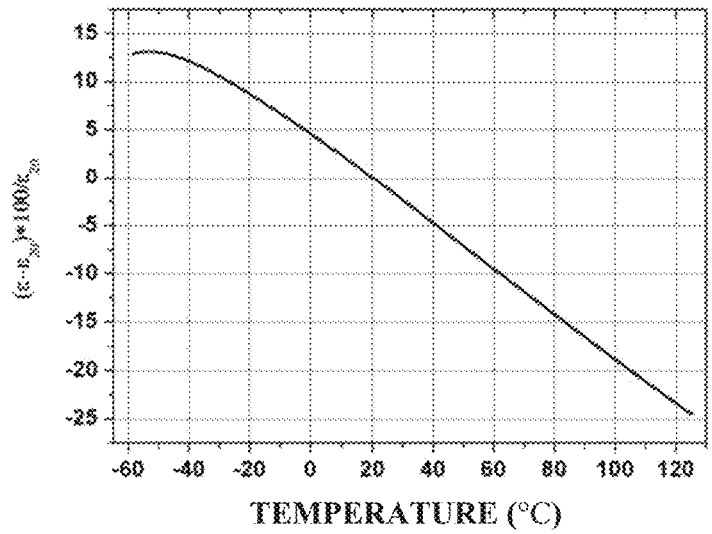
FIG. 11 shows the variation of dielectric constant with temperature of a standard ceramic sheet prepared in Example 2 of the present application.

BaTiO$_3$, SrTiO$_3$, TiO$_2$ Bi$_2$O$_3$, MgO, Al$_2$O$_3$, CaCO$_3$ and SiO$_2$ were weighed according to the formula of 0.25BaTiO$_3$+0.20SrTiO$_3$+0.13TiO$_2$+0.036Bi$_2$O$_3$+0.33MgO+0.012Al$_2$O$_3$+0.04CaO+0.002SiO$_2$, and then subjected to the same process as in Example 1 except that the holding time of sintering was 4 hours, to obtain the ceramic material. FIG. 10 shows the temperature dependence of dielectric constant and dielectric loss of the ceramic material in the example. It can be seen that the dielectric constant of the ceramic material is about 1,020, and the dielectric loss is about 0.0024 at room temperature and 1 kHz. As the temperature increases from −50° C., the dielectric constant decreases gradually. FIG. 11 shows a variation in permittivity with temperature of the ceramic material prepared in the example. It can be seen that the variation in permittivity of the ceramic material ranges are from +4.6 to −4.7 (at −0° C. to 40° C.) and +10.58 to −15.4 (at −30° C. to 85° C.). The dielectric strength at room temperature is 43.7 kV/mm at 1 mm, and 52.3 kV/mm at 0.38 mm, respectively.

Example 3

Figure 12:
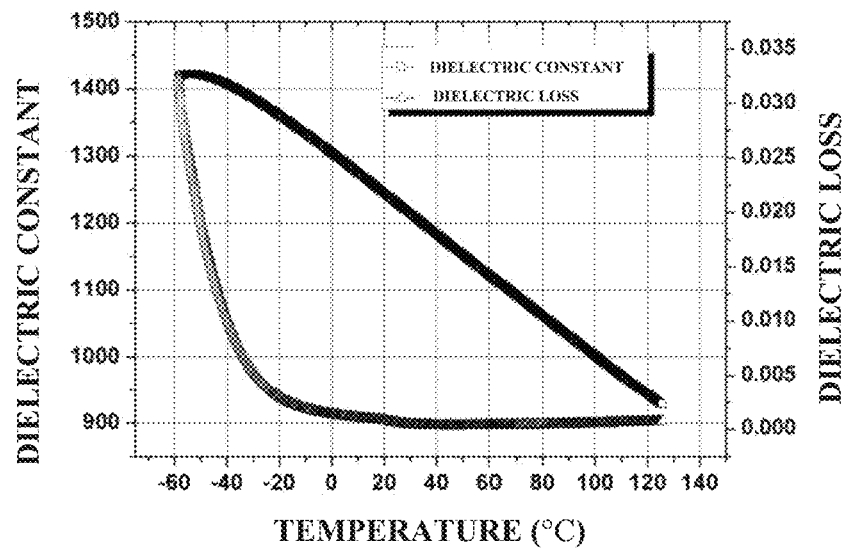
FIG. 12 shows the temperature dependence of the dielectric constant and loss of a standard ceramic sheet prepared in Example 3 of the present application.
Figure 13:
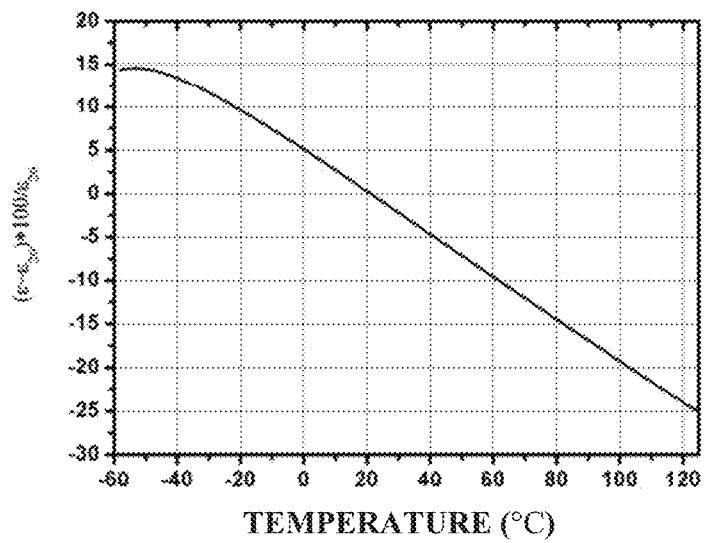
FIG. 13 shows the variation of dielectric constant with temperature of a standard ceramic sheet prepared in Example 3 of the present application.

BaTiO$_3$, SrTiO$_3$, TiO$_2$ Bi$_2$O$_3$, MgO, Al$_2$O$_3$, CaCO$_3$ and SiO$_2$ were weighed according to the formula of 0.28BaTiO$_3$+0.23 SrTiO$_3$+0.15TiO$_2$+0.04Bi$_2$O$_3$+0.245MgO+0.013Al$_2$O$_3$+0.04CaO+0.002SiO$_2$, and then subjected to the same process as in Example 1 except that the holding time of sintering was 4 hours, to obtain the ceramic material. FIG. 12 shows the temperature dependence of dielectric constant and dielectric loss of the ceramic material in the example. It can be seen that the dielectric constant of the ceramic material is about 1,228, and the dielectric loss is about 0.0004 at room temperature and 1 kHz. As the temperature increases from −50° C., the dielectric constant decreases gradually. FIG. 13 shows a variation in permittivity with temperature of the ceramic material prepared in the example. It can be seen that the variation in permittivity of the ceramic material are from +5.0 to −4.9 (at −0° C. to 40° C.) and +11.67 to −15.7 (at −30° C. to 85° C.). The dielectric strength at room temperature is 38.4 kV/mm at 1 mm, and 48.7 kV/mm at 0.38 mm, respectively.

Example 4

Figure 14:
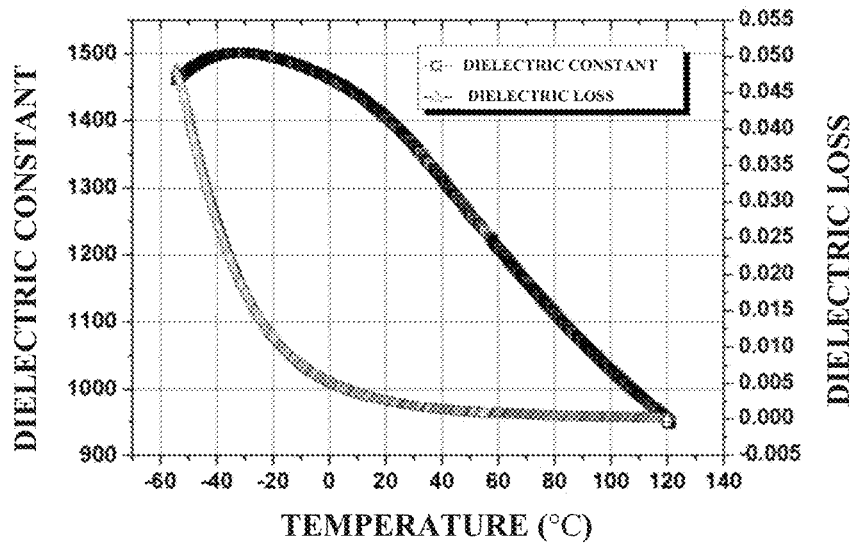
FIG. 14 shows the temperature dependence of the dielectric constant and loss of a standard ceramic sheet prepared in Example 4 of the present application.
Figure 15:
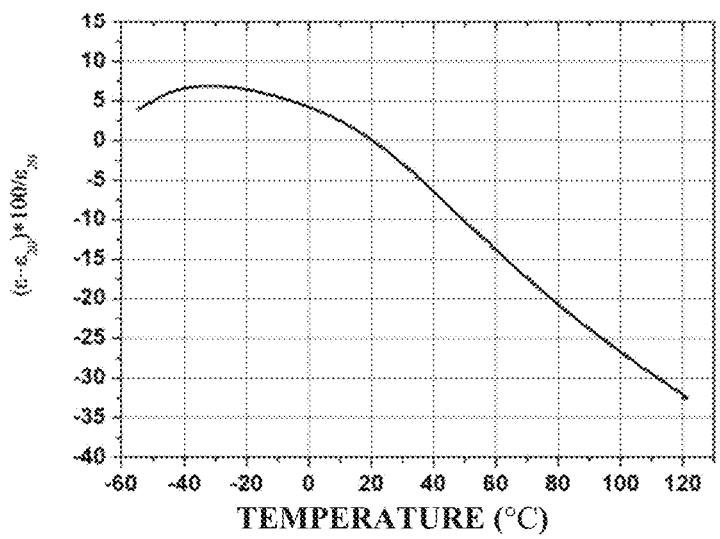
FIG. 15 shows the variation of dielectric constant with temperature of a standard ceramic sheet prepared in Example 4 of the present application.

BaTiO$_3$, SrTiO$_3$, TiO$_2$ Bi$_2$O$_3$, MgO, Al$_2$O$_3$, CaCO$_3$ and SiO$_2$ were weighed according to the formula of 0.412BaTiO$_3$+0.275SrTiO$_3$+0.16TiO$_2$+0.055Bi$_2$O$_3$+0.04MgO+0.055CaO+0.003SiO$_2$, and then subjected to the same process as in Example 1 except that the temperature and holding time of sintering were 1,260° C. and 4 hours, to obtain the ceramic material. FIG. 14 shows the temperature dependence of dielectric constant and dielectric loss of the ceramic material in the example. It can be seen that the dielectric constant of the ceramic material is about 1,385, and the dielectric loss is about 0.0021 at room temperature and 1 kHz. As the temperature increases from −50° C., the dielectric constant decreases gradually. FIG. 15 shows a variation in permittivity with temperature of the ceramic material prepared in the example. It can be seen that the variation in permittivity of the ceramic material is from +4.2 to −6.4 (at −0° C. to 40° C.) and +6.90 to −22.36 (at −30° C. to 85° C.). The dielectric strength at room temperature is 35.8 kV/mm at 1 mm, and 44.4 kV/mm at 0.38 mm, respectively.

Example 5

Figure 16:
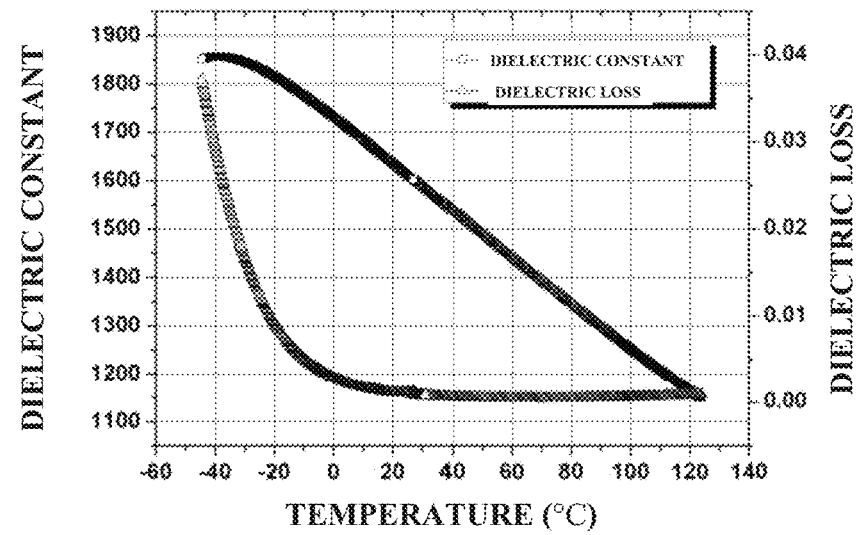
FIG. 16 shows the temperature dependence of the dielectric constant and loss of a standard ceramic sheet prepared in Example 5 of the present application.
Figure 17:
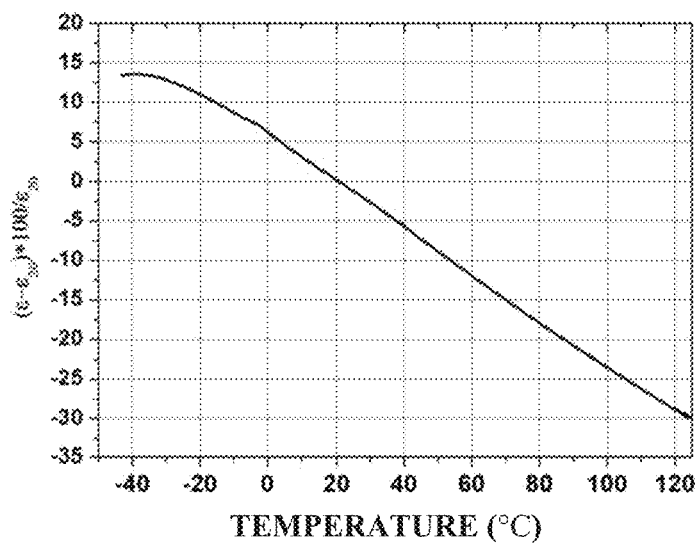
FIG. 17 shows the variation of dielectric constant with temperature of a standard ceramic sheet prepared in Example 5 of the present application.
Figure 18:
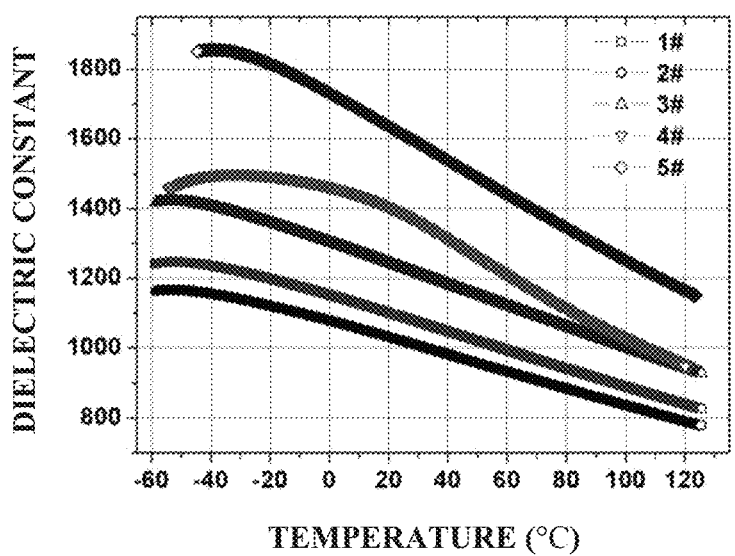
FIG. 18 shows the comparison of the variation of dielectric constant with temperature of standard ceramic sheets prepared in Examples 1-5 of the present application.

BaTiO$_3$, SrTiO$_3$, TiO$_2$ Bi$_2$O$_3$, MgO, Al$_2$O$_3$, CaCO$_3$ and SiO$_2$ were weighed according to the formula of 0.466BaTiO$_3$+0.25SrTiO$_3$+0.12TiO$_2$+0.06Bi$_2$O$_3$+0.04MgO+ 0.06CaO+0.004SiO$_2$, and then subjected to the same process as in Example 1 except that the temperature and holding time of sintering were 1,250° C. and 4 hours, to obtain the ceramic material. FIG. 16 shows the temperature dependence of dielectric constant and dielectric loss of the ceramic material in the example. It can be seen that the dielectric constant of the ceramic material is about 1,611, and the dielectric loss is about 0.0016 at room temperature and 1 kHz. As the temperature increases from −50° C., the dielectric constant decreases gradually. FIG. 17 shows a variation in permittivity with temperature of the ceramic material prepared in the example. It can be seen that the variation in permittivity of the ceramic material is from +6.4 to −5.8 (at −0° C. to 40° C.) and +12.85 to −19.35 (at −30° C. to 85° C.). The dielectric strength at room temperature is 30.5 kV/mm at 1 mm, 38.2 kV/mm at 0.38 mm, respectively.

TABLE 1

Dielectric Properties of the Barium Strontium Titanate Based Dielectric Ceramic Sheets (Diameter 30 mm) Prepared in Examples 1-5

| Example | Dielectric Constant (25° C., 1 kHz) | Dielectric Loss (25° C., 1 kHz) | Dielectric Strength (kV/mm at 1 mm) Electrode $\Phi = 8$ mm | Dielectric Strength (kV/mm at 0.38 mm) Electrode $\Phi = 1.5$ mm | Variation of Permittivity with Temperature (0° C. to 40° C.) | Variation of Permittivity with Temperature (−30° C. to 85° C.) |
|---|---|---|---|---|---|---|
| 1 | 1080 | 0.0015 | 40.5 | 51.6 | +4.8 to −4.7 | +10.87 to −15.6 |
| 2 | 1020 | 0.0024 | 43.7 | 52.3 | +4.6 to −4.7 | +10.58 to −15.4 |
| 3 | 1228 | 0.0004 | 38.4 | 48.7 | +5.0 to −4.9 | +11.67 to −15.7 |
| 4 | 1385 | 0.0021 | 35.8 | 44.4 | +4.2 to −6.4 | +6.90 to −22.36 |
| 5 | 1611 | 0.0016 | 30.5 | 38.2 | +6.4 to −5.8 | +12.85 to −19.35 |

In the material system of the present application, the contents of $BaTiO_3$, $SrTiO_3$, MgO and $Al_2O_3$ largely regulate the dielectric constant of the ceramic material. Especially, the dielectric constant of the ceramic material increases with the increase in $BaTiO_3$ content. The dielectric constant of the ceramic material decreases with the increase in MgO and $Al_2O_3$. The content of $TiO_2$, $Bi_2O_3$ and CaO determines the broadening degree of dielectric Curie peak, that is, the temperature stability of dielectric properties of the ceramic material. From the examples, it can be seen that the comprehensive influence of the contents of $BaTiO_3$, $SrTiO_3$, MgO and $Al_2O_3$ largely regulates the dielectric constant of the ceramic material.

The above examples show that the material system of the present application can be used to prepare ceramic materials with high dielectric constant, high dielectric strength and high dielectric stability. The dielectric strength of the prepared ceramic materials is as high as 52 kV/mm, the dielectric constant can be adjusted between 800 and 2,000, the dielectric loss is less than 0.003 (at 1 kHz), the variation in permittivity with temperature is 7% or less (0° C. to 40° C.), and the frequency stability is good. The material also has the advantages of being lead free and environmentally friendly, having a simple preparation process, etc. It is very suitable for high frequency capacitors, UHV capacitors, solid-state pulse forming lines and other components, and has great application value in the field of high power and pulse power.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A barium strontium titanate-based dielectric ceramic material, having a composition of $aBaTiO_3+bSrTiO_3+cTiO_2+dBi_2O_3+eMgO+fAl_2O_3+gCaO+hSiO_2$,
wherein a, b, c, d, e, f, g, and h are the molar percentage of each component, $20 \leq a \leq 50$ mol %, $15 \leq b \leq 30$ mol %, $10 \leq c \leq 20$ mol %, $3 \leq d \leq 10$ mol %, $4 \leq e \leq 35$ mol %, $0 \leq f \leq 6$ mol %, $3 \leq g \leq 6$ mol %, $0.1 \leq h \leq 1$ mol %, and $a+b+c+d+e+f+g+h=100$ mol %.

2. The barium strontium titanate-based dielectric ceramic material according to claim 1, wherein the barium strontium titanate-based dielectric ceramic material has a dielectric strength of 38 to 52 kV/mm at a thickness of 0.38 mm, a dielectric constant adjustable from 800 to 2,000, a dielectric loss of less than 0.003 at 1 kHz and 25° C., and an effective energy storage density as high as 8.6 J/cm$^3$ at 660 kV/cm.

3. The barium strontium titanate-based dielectric ceramic material according to claim 1, wherein the barium strontium titanate-based dielectric ceramic material has a permittivity variation of 7% or less between 0° C. and 40° C., and a DC resistivity of $10^{12}$ Ω·cm or greater at 100° C.

* * * * *

UNITED STATES PATENT AND TRADEMARK OFFICE
CERTIFICATE OF CORRECTION

PATENT NO. : 11,292,747 B2
APPLICATION NO. : 16/831631
DATED : April 5, 2022
INVENTOR(S) : Ying Chen et al.

Page 1 of 1

It is certified that error appears in the above-identified patent and that said Letters Patent is hereby corrected as shown below:

On the Title Page

Item (57), Line 5 and 6, delete "aBaTiO3+bSrTiO3+cTiO2+dBi2O3+eMgO+fAl2O3+gCaO +hSiO2" and insert --aBaTiO$_3$+bSrTiO$_3$+cTiO$_2$+dBi$_2$O$_3$+eMgO+fAl$_2$O$_3$+gCaO+hSiO$_2$--.

In the Specification

Column 2, Line 55 and 56, delete "aBaTiO3+bSrTiO3+cTiO2+d Bi2O3+eMgO+fAl2O3+gCaO+hSiO2" and insert --aBaTiO$_3$+bSrTiO$_3$+cTiO$_2$+dBi$_2$O$_3$+eMgO+fAl$_2$O$_3$+gCaO+hSiO$_2$--.

Column 3, Line 27 and 28, delete "aBaTiO3$_3$+bSrTiO$_3$+cTiO$_2$+d Bi$_2$O$_3$+eMgO+fAl$_2$O$_3$+gCaO+hSiO$_2$" and insert --aBaTiO$_3$+bSrTiO$_3$+cTiO$_2$+dBi$_2$O$_3$+eMgO+fAl$_2$O$_3$+gCaO+hSiO$_2$--.

Column 5, Line 25 and 26, delete "aBaTiO3$_3$+bSrTiO$_3$+cTiO$_2$+d Bi$_2$O$_3$+eMgO+fAl$_2$O$_3$+gCaO+hSiO$_2$" and insert --aBaTiO$_3$+bSrTiO$_3$+cTiO$_2$+dBi$_2$O$_3$+eMgO+fAl$_2$O$_3$+gCaO+hSiO$_2$--.

In the Claims

Column 10, Line 29, delete "$0 \leq f \leq 6$" and insert --$0 < f \leq 6$--.

Signed and Sealed this
Ninth Day of August, 2022

Katherine Kelly Vidal
*Director of the United States Patent and Trademark Office*